United States Patent [19]

Kosarko

[11] 3,767,294
[45] Oct. 23, 1973

[54] FILM CARTRIDGE WITH GUIDE FINGER
[76] Inventor: Gerald J. Kosarko, Pavilion, N.Y.
[22] Filed: May 24, 1972
[21] Appl. No.: 256,552

[52] U.S. Cl. .................. 352/78 R, 242/194, 352/29
[51] Int. Cl. ......................................... G03b 23/02
[58] Field of Search ................... 352/29, 37, 72, 78;
  242/194; 179/100.2 Z; 274/4 B, 11 B; 226/196

[56] References Cited
UNITED STATES PATENTS
3,348,786   10/1967   Miller et al. ................... 242/68.3 X
3,244,470    4/1966   Hennessey et al. ............. 352/128 X
3,442,580    5/1969   Winkler ............................ 352/72 X
3,635,414    1/1972   Patel ............................... 242/194 X
3,495,787    2/1970   Wallace ............................ 226/196
FOREIGN PATENTS OR APPLICATIONS
887,613   8/1943   France ............................ 352/78 R Primary Examiner—John M. Horan
Assistant Examiner—Alan Mathews
Attorney—William H. J. Kline et al.

[57] ABSTRACT

A cartridge to be loaded with a length of film or other strip material is adapted to be positioned in a sound motion picture camera, projector or other sound recording or reproducing apparatus. The cartridge has an open area across which the strip material extends so that the strip material in this area can cooperate with the sound mechanism of the apparatus. A guide finger is positioned with respect to the open area in the cartridge to (1) contain the strip material within the cartridge body and guide the film into position relative to the sound mechanism during insertion of the cartridge into the apparatus, (2) protect the film from damage during such insertion, and (3) avoid picking and possibly hand-damage to the film during such insertion.

2 Claims, 7 Drawing Figures

FILM CARTRIDGE WITH GUIDE FINGER

CROSS-REFERENCE TO RELATED APPLICATION

Reference is made to commonly assigned copending U.S. patent application, Ser. No. 256,242, entitled Film Cartridge With Guide Finger, filed May 24, 1972 in the name of Stephen H. Miller and Archie J. Tucker.

BACKGROUND OF THE INVENTION

1. Field of the Invention

This invention relates to cartridges or cassettes of the type adapted to receive and handle an elongate strip of web material and, more specifically, the invention relates to a film cartridge adapted to be positioned in a camera for exposure of the film to scene light and simultaneously for recording of sound onto the film by sound recording apparatus in the camera.

2. Description of the Prior Art

Film cartridges are well known, including the so-called "super 8" film cartridge which is adapted to receive a roll of unexposed 8 millimeter film and which is positionable in a camera for advancement of the film by a claw or other drive member in the camera to sequentially expose portions of the film strip to scene light. Cartridges of the super 8 type are disclosed in commonly assigned U.S. Pat. No. 3,208,685 issued to E. A. Edwards et al. on Sept. 28, 1965 and entitled, "Anti-Friction Disc for Strip Material Cartridge" and U.S. Pat. No. 3,208,686 issued to E. A. Edwards et al on Sept. 28, 1965 entitled "Film Cartridge."

It also is known to modify such super 8 film cartridges to provide for sound recording on the film in the cartridge, such being disclosed in U.S. Pat. No. 3,442,580 issued to A. Winkler on May 6, 1969 and entitled "Motion Picture Camera or Projector for Film with Sound Track." As disclosed in the latter patent, an intermittent film pull-down mechanism advances film in a frame-by-frame manner past an exposure aperture in the camera, and a capstan drive continuously advances film past a sound recording head spaced from the exposure aperture. The cartridge shown in the Winkler patent includes a second opening or aperture across which the film strip extends and the capstan drive and other sound apparatus in the camera are received in the opening in the cartridge when the cartridge is inserted in the camera so that such apparatus can engage the film in the area of the cartridge opening. Because of the relative width of the second opening with respect to the total width of the cartridge, and in view of the tendency of film to bow outwardly, especially when it is guided around corners, the film strip will tend to bow beyond the perimeter of the cartridge through the opening provided for the sound apparatus in the camera. This is objectionable, particularly when the sound camera and cartridge are to be used by amateur photographers, since the bowed portion of the film strip in the area of the opening for the sound apparatus complicates insertion of the cartridge into the camera and may result in improper position of the film in the camera. For example, the film can become twisted due to improper insertion of film relative to the cartridge chamber or sound apparatus. This is not only quite aggravating but can result in damage to the film and may prevent the recording of sound during filming. The problem is even greater when the opening is large, i.e., extends across an end wall and part of an adjacent side wall.

U.S. Pat. Nos. 3,348,786 and 3,244,470 show cartridges for tape and film, respectively, wherein spaced openings are provided along a relatively wide edge portion of a cartridge to receive a sound head, etc. Solid portions of the cartridge separate these openings. However, the total width of the edges including the openings is such that the bowing problem referred to above is not encountered or, due to the use of the magnetic tape which is more highly flexible than film, the problem does not occur.

In the before-mentioned copending U.S. Pat. application in the names of S. H. Miller and A. J. Tucker a film cartridge for a sound camera is disclosed wherein the cartridge has a guide finger that extends partially across an aperture for receiving sound apparatus in a camera. The finger is effective to avoid bowing of the film from the cartridge through the aperture. However the film can still be damaged or improperly positioned relative to the camera sound apparatus under certain conditions. In accordance with the present invention a modified guide finger is provided to further facilitate proper insertion of the cartridge into the camera and reduce the possibility of damage to film during loading of a cartridge into the camera.

SUMMARY OF THE INVENTION

An object of the present invention is the provision of a strip handling device, such as a film cartridge of the type described, wherein a relatively large opening is provided for accommodating sound apparatus in a camera, projector or the like, and wherein the chance of damage to the film or other strip material is minimized without unnecessarily complicating the structure of the cartridge or the apparatus which receives the cartridge.

Another object of the invention is the provision of a strip handling cartridge or the like of the type described wherein the cartridge can be easily positioned with respect to cooperating apparatus with little or no skill being required in order to effect correct positioning of the strip material with respect to the apparatus.

A further object of the invention is to provide a film cartridge for use in a sound camera wherein film is protected against twisting and/or damage during positioning of the film relative to the sound apparatus.

In accordance with the present invention a cartridge for handling a strip of film includes an end wall and first and second side walls adjacent the end wall, an aperture is provided in the end wall and the first side wall. The cartridge has means defining a path for the strip of film through the cartridge and across the aperture with the path defining means effecting a bend in the film adjacent the aperture so that the film tends to project through the aperture in the end wall. The cartridge is positionable in a camera having sound apparatus engageable with film in the cartridge through the aperture for advancing the film through the cartridge and recording sound onto the film. A guide member is connected to the second side wall and projects toward the first side wall by a distance substantially equal to the width of the end wall. The guide member is separated from the first side wall by the aperture in the first side wall. The guide member is positioned with respect to the path for the film across the aperture to hold the film against bowing outwardly through the aperture in the end wall and to guide the film into position with respect to camera sound apparatus during insertion of the cartridge into a camera. The guide member comprises a finger that has a base portion connected to the second wall and a narrower prong portion projecting from the base portion. The finger is sufficiently long to underlie substantially the entire width of the film path across the aperture in the end wall. The surface of the finger facing the path for strip material is substantially coplanar with the end wall.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which:

FIGS. 4, 5 and 6 are enlarged fragmentary cross-sectional views illustrating in sequence insertion of a cartridge of the invention into a sound camera or the like.

DESCRIPTION OF THE PREFERRED EMBODIMENT

Because photographic apparatus are well known, the present description will be directed in particular to elements forming part of, or cooperating more directly with, the present invention, apparatus not specifically shown or described herein being understood to be selectable from those known in the art.

Figure 1:
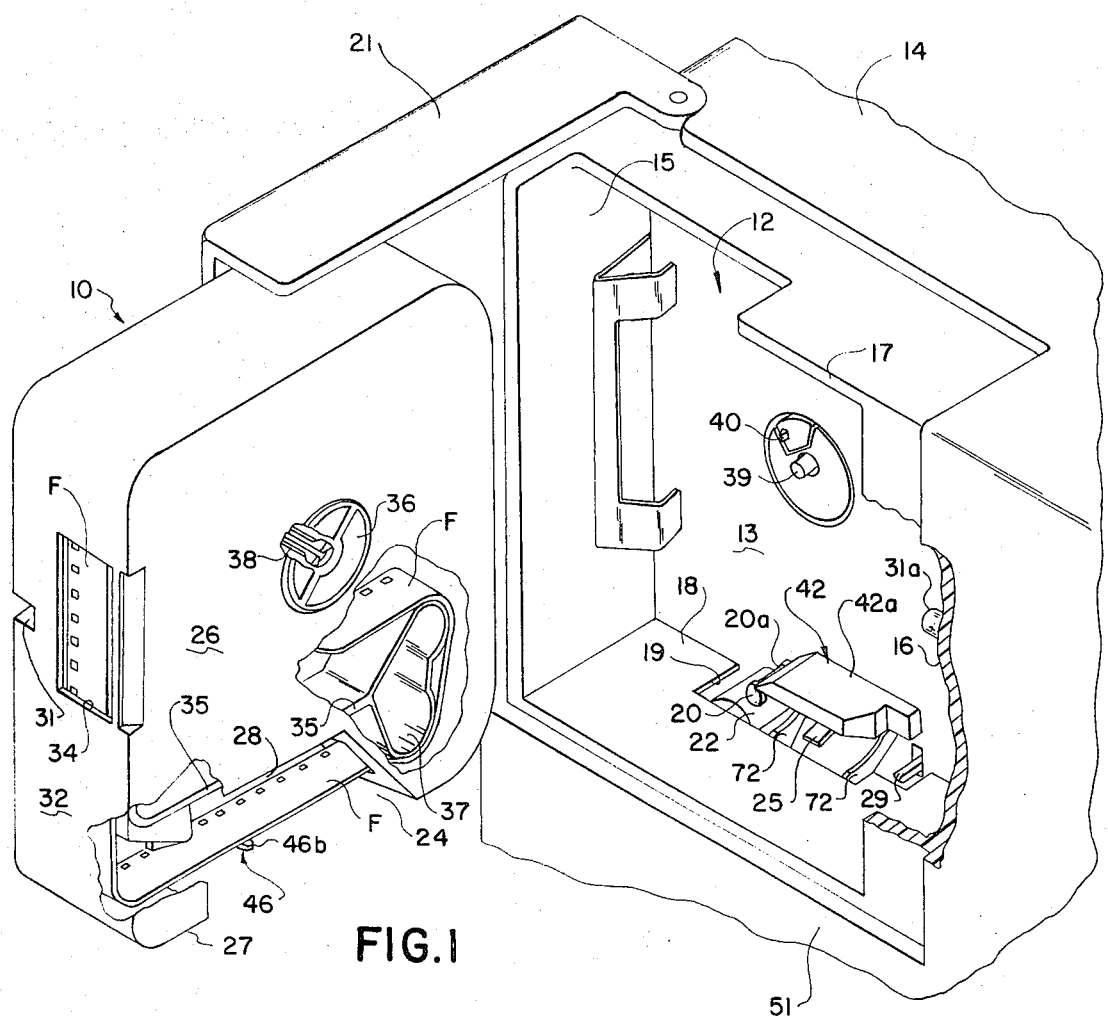
FIG. 1 is a perspective view of a film cartridge of the invention, partly broken away, and illustrating a portion of a motion picture camera adapted to receive the cartridge.

Referring now to the drawings, a cartridge incorporating features of the invention is generally designated 10 and is adapted to be received in a cartridge compartment or chamber 12 provided in a suitable camera, a portion of which is shown generally at 14. The cartridge chamber 12 is defined by an inner wall 13, side walls 15 and 16, an upper wall 17, a bottom wall 18 and a door 21 which closes the compartment in a lighttight manner. The camera is provided with a suitable film advancing member, such as a claw (not shown) which projects through wall 16 and is driven in a generally rectilinear path for intermittently advancing film F past an exposure aperture (not shown) in the camera. Wall 16 preferably is recessed as shown in FIG. 1, and the depth of chamber 12 preferably is substantially equal to or slightly greater than the thickness of the cartridge 10. This relationship reduces the possibility that the user will attempt to improperly insert the cartridge into the camera. In the lower wall 18 of the cartridge compartment 12 an opening 19 is provided to admit certain portions of camera apparatus used for effecting sound recording on the film in the cartridge as it is being exposed to scene light in the camera. This apparatus can include a capstan 20 having a wide groove 20a which receives the film. A movable pressure roller 22 is urged against the capstan so that rotation of the capstan in a clockwise direction effects rotation of the roller. The film engages a segment of the surface of roller 22 so that when the roller is rotated by the capstan the film is advanced from the exposure aperture past a sound head or transducer 23 (FIGS. 4–6) positioned between the capstan and the exposure aperture. A movable pressure member 25 urges the film sound track against the sound head, and a pair of spaced movable film guides 72 at opposite sides of the sound head guide the film between the sound head and member 25. A movable loop sensor 29 can engage the loop of film between the exposure aperture and the sound head, thereby sensing the length of film therebetween. Normally, there should be eighteen frames separation between the exposure aperture and the sound head. The loop sensor can be connected to suitable means (not shown) to control the film claw so that the desired separation is maintained within acceptable limits. The camera sound apparatus comprising roller 22, pressure member 25, film guides 72 and sensor 29 are movable by means (not shown) between the positions shown in FIG. 1 wherein they are retracted beneath wall 18 of the cartridge chamber to facilitate loading and unloading of a cartridge into the camera and an engaged position (not shown) wherein they are located for recording of sound onto the film.

The movable sound apparatus is received into the cartridge through an aperture 24 in one side 26 and the adjacent end 27 of the cartridge, the other side 28 and the ends 30 and 32 of the cartridge being substantially closed so that other parts of the cartridge are lighttight. Wall 28 of the cartridge and end walls 30 and 32 extend below the aperture 24. As shown in FIG. 1, end wall 32 of the cartridge has an exposure aperture 34 therein through which the film is exposed to scene light. A notch 31 in wall 32 cooperates with a pin 31a on wall 16 of the cartridge chamber for locating a cartridge in a camera as explained later. The portion of the cartridge above wall 35 that defines the top of aperture 24 perferably is substantially the same as the film cartridge disclosed in the beforementioned Edwards et al U.S. Pat. Nos. 3,208,685 and 3,208,686, the disclosure of such patents being incorporated herein by this reference.

Figure 4:
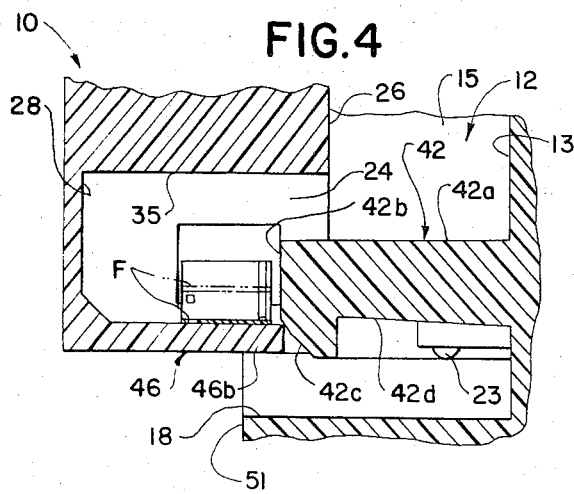
Figure 6:
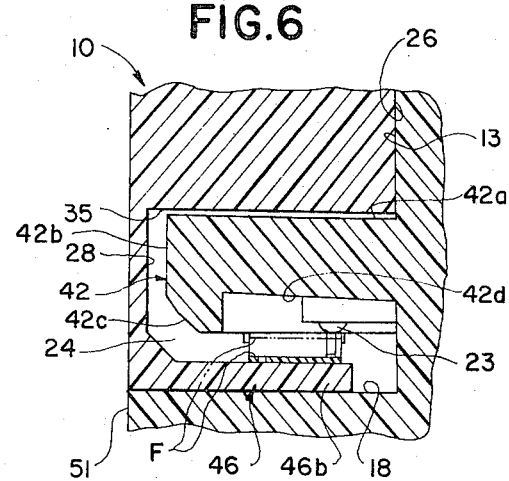
Figure 5:
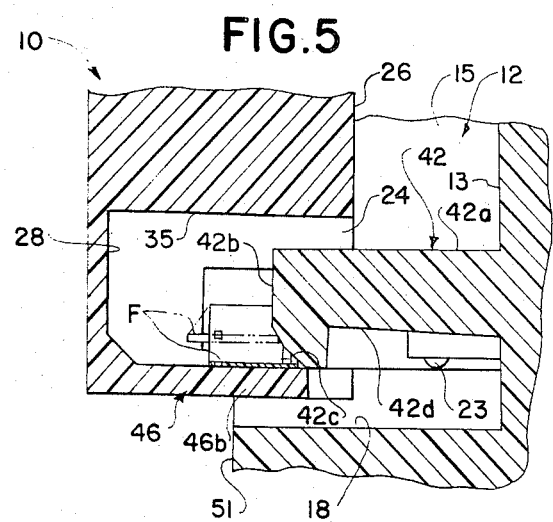

The film is guided through the cartridge from a supply chamber (not shown) inside wall 28, past aperture 34, then around a substantially 90° bend and across aperture 24, around a snubber 37 and then into the take-up chamber in the cartridge that is inside wall 26. The film path across aperture 24 is substantially parallel to end wall 27 and perpendicular to wall 26 so that the edge of the film is exposed at the portion of the aperture 24 in wall 26. The film is not rigidly held against movement prior to insertion into the cartridge so the film can occupy a range of positions across aperture 24 (as shown in FIGS. 4–6). Of course, the tendency of the film to bow from aperture 24 is increased when the film is slack across aperture 24. After the film passes the capstan 20 and enters the take-up chamber it is wound onto a take-up core 36 located in the take-up chamber of the cartridge and partially exposed at the exterior of the cartridge. As is well known in the art, the take-up core 36 preferably operates in connection with a suitable anti-backup device to prevent clockspringing of the film roll in the cartridge. For a sound cartridge of the type disclosed herein it is preferred that the anti-backup mechanism be disengageable to eliminate any "clicking" noise that may be associated with operation of such a device. Therefor the anti-backup mechanism preferably is of the type disclosed in the copending U.S. patent application, Ser. No. 229,924, filed Feb. 28, 1972 in the name of Archie J. Tucker and entitled "Disengageable Anti-Backup Device for Film Cartridge," such application having been refiled as continuation-in-part application, Ser. No. 323,019 on Jan. 12, 1973, a portion of which is illustrated at 38 in FIG. 1. The anti-backup mechanism may be disengaged automatically by a pin 39 projecting from wall 13 of the camera. The take-up core 36 can be driven in a conventional manner through a friction clutch by a suitable drive member 40 projecting into a chamber 12 from the inner wall 13 of the cartridge chamber.

Referring now to FIGS. 1 and 4-6, a shroud 42 projects into cartridge compartment 12 from wall 13 of the camera. The shroud is positioned approximately midway between walls 15 and 16 and is adjacent to, but spaced from, wall 18 of the camera. The flat upper surface 42a of the shroud is substantially parallel to the top wall 17 of the cartridge chamber and is spaced from that wall of the chamber so that a conventional (i.e., silent) super 8 film cartridge of the type disclosed in the beforementioned Edwards et al patents can be inserted into cartridge chamber 12 and positioned between the shroud and wall 17. As explained in more detail later, surface 42a is positioned immediately beneath the wall 35 of the sound cartridge 10 when the latter is inserted into the cartridge chamber.

The outermost edge surface 42b of the shroud is substantially parallel to the inner wall 13 of the cartridge chamber and perpendicular to surface 42a. A bevelled surface 42c on the shroud tapers inwardly from the lower edge of surface 42b toward camera wall 13 and the lower wall 18 of the cartridge chamber. The shroud includes an undercut portion 42d between the bevelled surface and wall 13. As shown in FIGS. 4-6, the sound head 23 is located within the confines of the recess or undercut portion 42d of the shroud. Thus during insertion of the cartridge 10 into the camera the portion of the film F extending across aperture 24 must be moved through the space between the lower edge of bevelled surface 42c and wall 18 so that it can be urged upwardly into contact with the sound head by the pressure member 25 and other of the movable portions of the sound apparatus as they are moved from their retracted position shown in FIG. 1 upwardly into engagement with the lower surface of the film strip.

Figure 2:
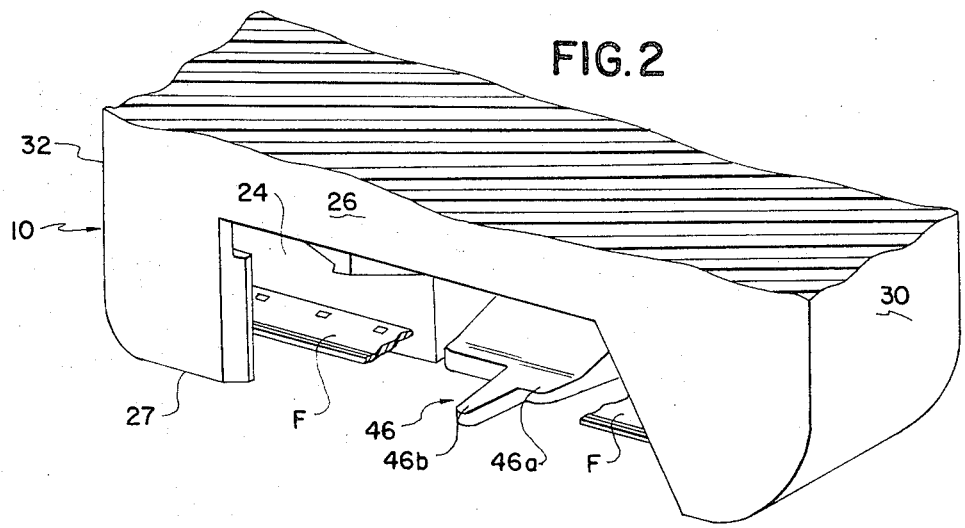
FIG. 2 is an enlarged fragmentary perspective view of the lower portion of the film cartridge shown in FIG. 1.
Figure 3:
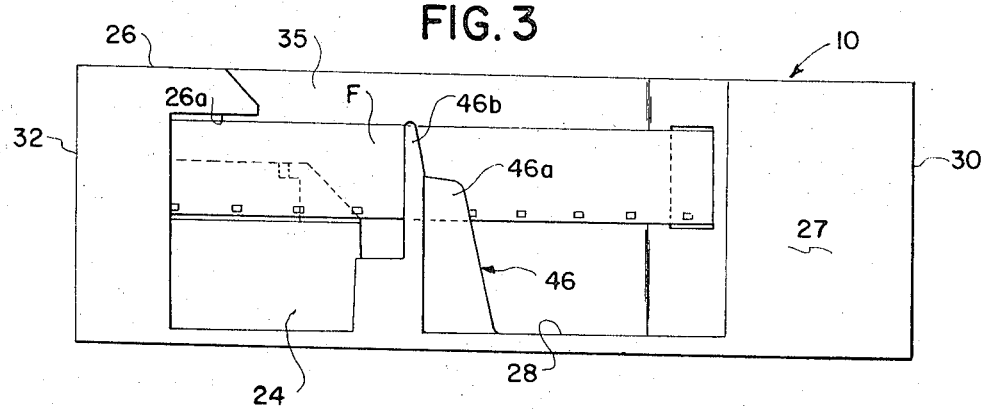
FIG. 3 is a bottom plan view of the cartridge shown in FIGS. 1 and 2.

As best shown in FIGS. 1-3, aperture 24 begins in wall 27 near the end wall 32 of the cartridge and extends a major portion of the distance between that end wall and wall 30 of the cartridge. Also, it extends from wall 28 entirely across the bottom wall 27 of the cartridge and then upwardly along wall 26 to the wall 35 defining the bottom of the take-up chamber of the cartridge. Thus the aperture 24 leaves the major portion of the bottom of the cartridge open not only across wall 27 of the cartridge but also upwardly along wall 26 thereof. As a result, an exposed length of the film strip extends across aperture 24 of the cartridge. There is a tendency for the film strip to project beyond the perimeter of the cartridge through the aperture due to the fact that film is relatively stiff (even though it is also flexible) and it resists the bending necessarily encountered as it travels first along wall 32 and then along wall 27 and across aperture 24. This tendency is encouraged by the size of the aperture 24 i.e., it extends across the major portion of the bottom wall 27 of the cartridge. In other words, the configuration of the cartridge requires a substantially 90° bend in the film at the intersection of walls 27 and 32, and the inherent stiffness of the film opposes this bending even though the film is sufficiently flexible to permit such bending. If the film were permitted to project through aperture 24 and below the surface of wall 27, then correct insertion of the cartridge into the camera would be quite difficult since it would be necessary to manually push the film back up into aperture 24 at the same time the cartridge is being moved inwardly into the cartridge chamber to bring cartridge wall 26 up against wall 13 and to bring the unenclosed portion of the film strip that extends across aperture 24 into the space below shroud 42 and above camera wall 18. Such manipulation would be particularly difficult for amateurs, and failure to properly position the film during loading can result in damage to the film, etc. In accordance with the present invention, this potential difficulty is avoided by the provision of a guide finger 46 which projects from the lower edge of wall 28 of the cartridge across the aperture 24 at a point substantially midway between the ends of the aperture in wall 27. The lower surface of finger 46 is substantially coplanar with wall 27 of the cartridge and its thickness is substantially equal to the thickness of wall 27 so that the inner surface thereof is substantially in line with the inner surface of wall 27. As best illustrated in FIG. 3, the length of finger 46 is only slightly less than the width of wall 27. However, as disclosed in the related patent application in the names of S. H. Miller and A. J. Tucker, objectionable bowing of the film through aperture 24 beyond the periphery of wall 27 can be avoided by base portion 46a of finger 46, such portion extending across approximately one-half of the width of the film. Finger 46 not only prevents the bowing of the film as noted hereinbefore but also helps guide the film into its loaded position in the camera.

In accordance with the present invention, finger 46 includes a narrow prong portion designated 46b at the outermost end portion of the finger. As illustrated in FIG. 3, prong 46b extends beyond the wider base portion 46a by a distance sufficient to bring the outermost tip of portion 46b to a point equal to or just beyond the side edge of the film F and the inner surface 26a of wall 26. The prong of the finger is spaced from wall 26 by the portion of the aperture in wall 26 so that it does interfere with proper insertion of the cartridge into the camera. Surface 26a of wall 26 helps limit sideward movement of the film relative to the cartridge in a direction which would permit the side edge thereof to extend beyond the prong portion 46b of the finger 46.

Referring now to FIGS. 4-6, during insertion of the sound cartridge 10 into the chamber 12 of the camera, the cartridge is positioned generally as shown in FIG. 1 but with the wall 26 facing wall 13 of the camera and inclined with respect to that wall so that the cartridge wall 32 is nearer wall 13 than is the cartridge wall 30. The cartridge should be generally aligned with chamber 12 so that the cartridge will fit within walls 17 and 18 of the chamber. At this time the portion of the aperture 24 in wall 26 of the cartridge is substantially aligned with the shroud 42a as shown in FIG. 4. Then the cartridge is moved inwardly into the cartridge chamber with the edge portion of cartridge defined by end wall 32 and side wall 28 contacting the camera wall 16 first. Cartridge wall 32 is moved toward camera wall 16 until notch 31 receives locating pin 31a on wall 16 of the camera. The cartridge is then swung through an intermediate position (FIG. 5) and into its fullyloaded position in the camera (FIG. 6) by bringing end wall 30 of the cartridge into the cartridge chamber until cartridge wall 26 is flush against the camera wall 13.

As the insertion of the cartridge proceeds in the manner described in the preceding paragraph, finger 46 of the invention prevents bowing of the film below cartridge wall 27, thereby facilitating proper insertion of the cartridge into the camera without damage to the film. For example, such damage might occur in the absence of finger 46 by the film engaging surface 51 of the camera adjacent chamber 12 and explained in more detail in the copending, related patent application entitled "Film Cartridge With Guide Finger," filed in the names of S. H. Miller and A. J. Tucker and referred to hereinbefore.

The guide finger 46 of the invention avoids "picking" of the film during typical conditions encountered when loading a cartridge to a camera. The term "picking" as used herein refers to engagement between the exposed strip of film across aperture 24 and the shroud or other camera apparatus, for example, which results in twisting or other deflection of the film to avoid or impede its proper positioning with respect to the sound head 23. This picking might not occur even in the absence of finger 46 if the film strip were stretched taut across aperture 24 and if the film were exactly aligned with the space between the bottom of the shroud 42 and the wall 18 of the camera during insertion of the cartridge into the chamber in the manner explained hereinbefore. However, such picking can readily occur if the exposed strip of film is somewhat misaligned with the space between the shroud and wall 18, or if prong portion 46b of the guide finger were omitted and an attempt was made to insert the cartridge into the camera by moving the cartridge downwardly into the chamber so that the finger 46 were initially brought into the cartridge chamber in line with or above the portion 42b of the shroud. The latter situation might occur if wall 17 at the top of the cartridge chamber were relatively short. In this regard, it should be recognized that a cartridge of the invention should be substantially foolproof and avoid the picking problem when used with cameras made by many different manufacturers, not all of which will make the camera walls surrounding the cartridge chamber substantially as wide as the cartridge itself in the manner described hereinbefore.

Figure 7:
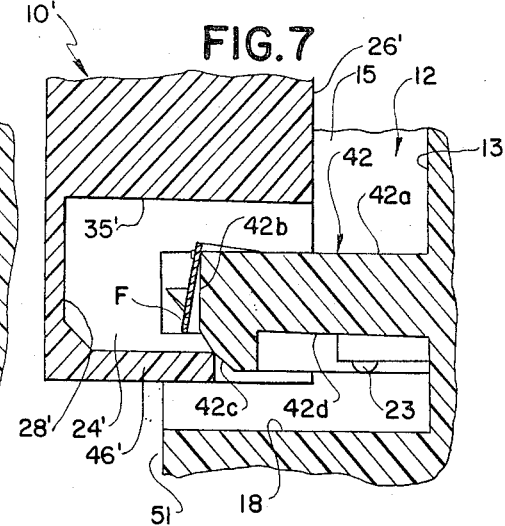
FIG. 7 is a sectional view similar to that illustrated in FIGS. 4–6 but showing a cartridge of the type disclosed in the copending U.S. Patent application in the names of S. H. Miller and A. J. Tucker, and illustrating the film twisted in a manner that might occur in the absence of the guide finger structure of this invention.

FIG. 7 of the drawings illustrates a cartridge designated 10' and which is substantially the same as the cartridge 10 described herein except that the finger 46' includes only the base portion 46a'. During loading of the cartridge in the chamber 12, and assuming that the cartridge initially is not exactly aligned with the chamber as illustrated in FIG. 7 (and as may occur if camera walls 15–18 are not substantially as wide as the thickness of the cartridge), the side edge of the film can engage surface 42b of the shroud before the finger portion 46a' engages that surface of the shroud and then moves downwardly and inwardly along surface 42c. Because the edge of the film is not fully protected by the finger and engages the shroud prior to being guided to the tapered portion 42c, the film becomes twisted as illustrated in FIG. 7. If insertion of the cartridge continued with the film twisted, the film would become broken or otherwise damaged during insertion of the cartridge and, of course, the film would fail to be properly positioned with respect to sound head 23 to effect recording of sound onto the film during operation of the camera. As illustrated in FIGS. 4–6, however, the presence of the tip or prong portion 46b of the guide finger avoids picking or twisting of the film because the tip portion engages the shroud surface 42b and protects the side edge of the film from that portion of the shroud until the finger slides far enough along surface 42c to bring the edge of the film into engagement with surface 42c of the shroud. Thereafter the downward and inward movement of the cartridge necessary to bring the finger below the shroud and into the space above wall 18 permits the edge of the film to slide along the surface 42c and move into the proper position with respect to sound head 23. Thus the prong portion 46b serves to protect the outermost edge of the film strip from engagement with the shroud at least until the edge of the film is aligned with the surface 42c as shown in FIG. 5, thereby to avoid twisting, breaking or other damage to the film that might otherwise result. Also, the finger guides the film to its proper position beneath the shroud because the film is resting against or at least is very near to the inner surface of the finger, and therefore moves downwardly and inwardly with the finger in the manner shown in FIGS. 4–6. In the event there is an attempt to load the cartridge into the camera from a steep angle and from the top of the chamber so that the finger 46 engages the top surface 42a of the shroud, then, of course, the user will find that the cartridge cannot enter the chamber due to interference between the top edge of the cartridge and the wall 17 of the chamber. Thus the guide finger 46 including the prong portion 46b serves to virtually eliminate the problems that might ordinarily be encountered by even an inexperienced person attempting to insert a cartridge into the cartridge chamber in the camera.

The guide finger also affords another desirable result. More specifically, it will minimize, if not altogether eliminate, the chance that a person will pull downwardly on the exposed strip of film across aperture 24 to form a long loop of the film below aperture 24. Finger 46 tends to block such extension of the film even if it is manual and intentional. Of course, if the film does accidently or otherwise becomes slack in the area of aperture 24, it can be made taut simply by rotating the take-up core 36 of the cartridge manually in a clockwise direction as viewed in FIG. 1.

The invention has been described in detail with particular reference to preferred embodiments thereof, but it will be understood that variations and modifications can be effected within the spirit and scope of the invention.

I claim:

1. In a cartridge for handling a length of film or other flexible strip material, the cartridge having an end wall and first and second side walls adjacent the end wall, the cartridge having an aperture located in the end wall and the first side wall in the cartridge, means defining a path for the film through the cartridge and across the aperture, the cartridge being usable with sound apparatus engageable with the film in the cartridge through the aperture for recording sound on the film and for advancing the film through the cartridge, the improvement comprising:

a guide finger comprising a base portion connected to the second side wall and a relatively narrow prong portion projecting from the base portion, the finger projecting substantially entirely across the portion of the aperture in the end wall and between the ends of the aperture in the end wall so that the outermost portion of the finger protects the film from possible twisting or damage that might occur in the absence of the finger during positioning of the film relative to the sound apparatus, the finger being positioned with respect to the film path across the aperture to limit outward bowing of the film through the aperture.

2. In a cartridge for handling a strip of film, the cartridge having an end wall and first and second side walls adjacent the end wall, means defining an aperture in the end wall and the first side wall, the cartridge having means defining a path for the strip of film through the cartridge and across the aperture, the path defining means effecting a bend in the film adjacent the aperture so that the film tends to project through the aperture in the end wall, the cartridge being positionable in a camera having sound apparatus engageable with film in the cartridge through the aperture for advancing the film through the cartridge and recording sound onto the film, the improvement comprising:

a guide member connected to the second side wall and projecting toward the first side wall by a distance substantially equal to the width of the end wall, and the guide member being separated from the first side wall by the aperture in the first side wall, the guide member being positioned with respect to the path for the film across the aperture to hold the film against bowing outwardly through the aperture in the end wall and to guide the film into position with respect to camera sound apparatus during insertion of the cartridge into a camera, the guide member comprising a finger having a base portion connected to the second wall and a narrower prong portion projecting from the base portion, the finger being sufficiently long to underlie substantially the entire width of the film path across the aperture in the end wall, the surface of the finger facing the path for strip material being substantially coplanar with the end wall.

* * * * *